March 24, 1970     P. PATIGNY     3,502,869
DEVICE FOR THE CONTINUOUS AND AUTOMATIC MEASUREMENT
OF GAMMA-RAY EMISSION OF A SOLUTION
Filed March 23, 1967
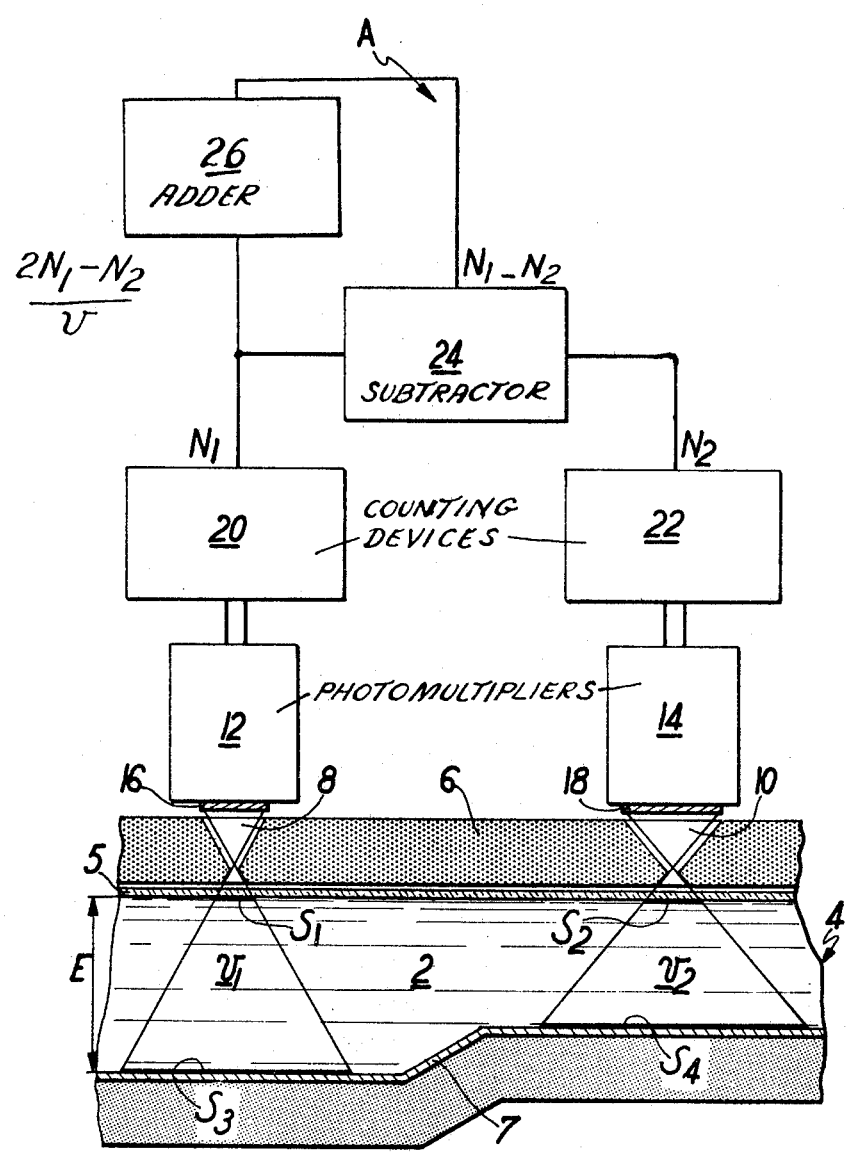

United States Patent Office 3,502,869
Patented Mar. 24, 1970

3,502,869
DEVICE FOR THE CONTINUOUS AND AUTOMATIC MEASUREMENT OF GAMMA-RAY EMISSION OF A SOLUTION
Pierre Patigny, Cherbourg, France, assignor to Commissariat a l'Energie Atomique, Paris, France
Filed Mar. 23, 1967, Ser. No. 625,348
Claims priority, application France, Apr. 5, 1966, 56,560
Int. Cl. G01n 23/12
U.S. Cl. 250—43.5                                1 Claim

ABSTRACT OF THE DISCLOSURE

A method of measurement of the gamma-ray emission of a radioactive solution which consists in placing outside a cell two photomultiplier units which see respectively two volumes $v_1$ and $v_2$ of liquid which are in a known ratio $\rho_1$ and contaminated surfaces having different areas $s_1$ and $s_2$ in a ratio $\rho_2$ which is also known and different from $\rho_1$, in measuring the activity of the liquid by means of the two photomultiplier units and in deducing therefrom the activity of the liquid per unit volume by applying the relation:

$$A_u = \left(\frac{1}{v_1}\right) \frac{N_1 - \rho_2 N_2}{\rho_1 - \rho_2}$$

and a device for carrying out the method.

---

This invention has for its object a method for measuring the total gamma-ray emission of a radioactive solution of fission products. The invention is also directed to a device for the application of said method.

The measurement of the gamma-ray emission of radioactive liquids obtained during operations involving the processing of irradiated nuclear fuels provides a means of checking the effectiveness of the extraction banks and is one of the main applications of the method referred to above.

In one known method, this measurement is taken in non-continuous operation. The method calls for processing of active solutions by operating personnel and consequently for the positioning of shielding equipment, thus resulting in excessive delay between the moment of withdrawal of said solution for sampling and the time of measurement.

Attempts have been made to remedy this situation by making use of a photomultiplier-scintillator assembly for the purpose of taking a direct and continuous measurement of the gamma-ray emission of solutions under analysis. Unfortunately, the adsorption of fission products on the walls of the measuring cell introduces a cause of error which it has not proved possible to remove up to the present time despite the adsoption of various makeshift solutions which have subsequently proved inadequate.

It has been sought to eliminate the adsorption phenomenon by causing the liquid to flow in front of a photomultiplier tube in the form of a fine stream of constant diameter which passes through a lead chamber having substantial dimensions. A further expedient has consisted in making use of cells wherein the photomultiplier tube sees the radioactive liquid through a collimator having a special geometry and which masks the side walls, but the results achieved have not shown greater promise. Finally, the use of a vessel having walls which cannot be contaminated has also failed to provide a satisfactory solution to the problem.

The method of measurement according to the present invention does not seek to eliminate the gamma-ray emission which arises from adsorption but takes such emission into account.

The method under consideration accordingly consists in placing outside a measuring cell two photomultiplier-scintillator units which see respectively two volumes $v_1$ and $v_2$ of radioactive liquid which are in a known ratio $\rho_1$ and two contaminated surfaces $s_1$ and $s_2$ having different areas which are also in a known ratio $\rho_2$ which is different from $\rho_1$, in measuring the activity of the liquid by means of the two photomultiplier units by counting the number of pulses $N_1$ and $N_2$ which appear during the same time interval at the anodes of said photomultiplier units, and in deducing therefrom the activity of the liquid per unit volume by applying the relation $$A_u = \left(\frac{1}{v_1}\right)\left(\frac{N_1 - \rho_2 N_2}{\rho_1 - \rho_2}\right)$$

The method outlined above can be carried out with particularly great ease when the two volumes $v_1$ and $v_2$ are equal whilst the surface areas $s_1$ and $s_2$ are different.

A measuring device for the practical execution of this method is characterized in that it is constituted by a duct section which performs the function of a measuring cell and has two parallel walls, one wall being plane and transparent and the other wall being formed by two segments of plane located at different distances from the first wall and joined to each other, the transparent wall being lined with a lead shielding plate designed to serve as a radiological protection element and provided with two collimating openings, two photomultiplier-scintillator units which see through said openings equal volumes of liquid but contaminated surfaces having areas which are in a ratio of 1:2, two devices for counting pulses which appear at the output of each photomultiplier, a subtracter which is coupled with two counting devices and performs the operation $N_1 - N_2$ and an adder which supplies the activity per unit volume $$\frac{2N_1 - N_2}{v}$$

Aside from these main arrangements, the invention is also concerned with a number of different secondary arrangements, these arrangements being mentioned hereinafter in connection with forms of construction of the device which is proposed for the utilization of the method according to the invention.

The device herein described is intended to take measurements of gamma-ray emissions of two equal volumes of radioactive liquid as increased respectively by the gamma-ray emissions of two contaminated surfaces having areas in the ratio of 1:2. In consequence, the calculation of the activity per volume of liquid under analysis can be deduced from the measurements by means of a very simple electronic device.

In order that the technical characteristics of the invention may become more readily apparent, one exemplified embodiment will now be described in reference to the accompanying figure, it being understood that said embodiment is not given in any limiting sense so far as the modes of execution or potential applications of the invention are concerned.

The method according to the invention recommends the use of two photomultiplier-scintillator assemblies which see two volumes of radioactive liquid $v_1$ and $v_2$ having a ratio $\rho_1$ at the same time as two contaminated surfaces having areas $s_1$ and $s_2$, the ratio $\rho_2$ of which is different to $\rho_1$. A simple calcualtion will now be given to show how the activity of the liquid per unit volume $A_u$ can be deduced from measurements taken by means of photomultiplier-scintillator assemblies.

It will be assumed that the first photomultiplier records a given number of pulses $N_1$ during a given time interval $t$. This number is proportional to the sum of the activity $V_1$ of the volume of liquid $v_1$ increased by the activity $S_1$ of the contaminated surface $s_1$. Similarly, the second photomultiplier records during the same time interval $t$ a number of pulses $N_2$, this number being proportional to the sum of the activity $V_2$ of the volume of liquid $v_2$ increased by the activity $S_2$ of the contaminated surface $s_2$. Thus, we may write:

$$N_1 = V_1 + S_1 \quad (1)$$

$$N_2 = V_2 + S_2 \quad (2)$$

$$\rho_1 = \frac{v_1}{v_2} \text{ (ratio of volumes of liquid) and}$$

$$\rho_2 = \frac{s_1}{s_2} \text{ (ratio of areas of contaminated surfaces)}$$

It is apparent that, under these conditions, $$\rho_1 = \frac{V_1}{V_2} \quad (3)$$

and similarly that, $$\rho_2 = \frac{S_1}{S_2} \quad (4)$$

If we calculate the values $V_1$ and $S_1$ according to Equations 3 and 4, we have:

$$V_1 = \rho_1 V_2$$

$$S_1 = \rho_2 S_2$$

Substituting these values in Equation 1, we get:

$$N_1 = \rho_1 V_2 + \rho_2 S_2 \quad (5)$$

Multiplying by $\rho_2$ the two terms of Equation 2, then subtracting this new equation from 5, we have:

$$V_2 = \frac{N_1 - \rho_2 N_2}{\rho_1 - \rho_2}$$

Hence the activity per unit volume, $$A_u = \left(\frac{1}{v_2}\right)\left(\frac{N_1 - \rho_2 N_2}{\rho_1 - \rho_2}\right) \quad (6)$$

The calculation of the activity per unit volume becomes more simple when the volumes $v_1$ and $v_2$ are equal. Under these conditions, $\rho_1 = 1$ and the activity $A_u$ becomes:

$$A_u = \left(\frac{1}{v}\right)\left(\frac{N_1 - \rho_2 N_2}{1 - \rho_2}\right) \quad (7)$$

In order to carry out the method in accordance with the invention, the present applicant has constructed a measuring device in which the simplification of calculation of unitary activity is even greater since the two volumes of liquid under analysis are equal, and the contaminated surfaces therefore have areas in a ratio of 1:2. In this case, the unitary activity $A_u$ has a particularly simple value $1/v \ (2N_1 - N_2)$ or $$\frac{2N_1 - N_2}{v}$$

The above device is illustrated in the accompanying figure and is designated by the letter A. The radioactive liquid 2 circulates within a duct comprising a measuring cell 4 which will be described later. One of the walls 5 which limits said cell is transparent to $\gamma$-rays and covered by a lead plate 6 providing protection against the radioactivity of the liquid and comprising two openings 8 and 10 which play the part of collimators for two assemblies consisting of photomultipliers (12–14) in contact with scintillators (16–18).

The shapes of the openings 8–10 are determined so that the units 12–16 and 14–18 see identical volumes of liquid and contaminated surfaces having areas $s_1$ and $s_2$ which are in the ratio 1:2.

It may be noted that the depth or thickness E of the measuring cell is sufficiently great to ensure that the gamma-ray emissions arising from the radio elements adsorbed on the surfaces $s_3$ and $s_4$ of the bottom wall 7 of the measuring cell which are are located in the field of the photomultipliers are of negligible intensity. The pulses produced by the photomultipliers are transmitted respectively to counting devices 20–22 which indicate respectively $N_1$ and $N_2$. The inputs of a subtracting device 24 are coupled to the outputs of the counting devices 20, 22 and said subtracting device effects the difference $N_2 - N_1$. Finally, the adding device 26 which receives the difference $N_1 - N_2$ at one of its inputs and $N_2$ at the other input gives the activity per unit volume of the liquid which is equal to $$\frac{2N_1 - N_2}{v}$$

What is claimed is:

1. A device for measurement of the gamma-ray emission of a radioactive liquid and consisting of a tank having two walls wherein one wall is plane and transparent and the other wall is constituted by two segments of planes located at different distances from the first wall, the wall which is transparent to $\gamma$-radiation being lined with a lead plate designed to serve as a radiological protection element and provided with two openings which perform the function of collimator, first and second photomultiplier-scintillator assemblies which see through said openings equal volumes of liquid but contaminated surfaces having areas in a ratio of 1:2, two devices for counting pulse rates $N_1$, $N_2$ which appear at the output of the photomultiplier and means for supplying $2N_1 - N_2$.

References Cited

UNITED STATES PATENTS 3,105,146  9/1963  Goupil et al.
3,267,782  8/1966  Zwetzig et al.

ARCHIE R. BORCHELT, Primary Examiner

U.S. Cl. X.R.

250—106